(12) United States Patent
Ritter (10) Patent No.: US 10,930,029 B2
(45) Date of Patent: Feb. 23, 2021

(54) METHOD FOR PROCESSING MEDICAL IMAGE DATA AND IMAGE PROCESSING SYSTEM FOR MEDICAL IMAGE DATA

(71) Applicant: Siemens Healthcare GmbH, Erlangen (DE)

(72) Inventor: Andre Ritter, Neunkirchen am Brand (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 238 days.

(21) Appl. No.: 16/117,026

(22) Filed: Aug. 30, 2018

(65) Prior Publication Data

US 2019/0073803 A1  Mar. 7, 2019

(30) Foreign Application Priority Data

Sep. 7, 2017  (EP) .................................... 17189821

(51) Int. Cl.
   *G06T 11/00*  (2006.01)

(52) U.S. Cl.
   CPC .......... *G06T 11/005* (2013.01); *G06T 11/006* (2013.01); *G06T 2210/41* (2013.01)

(58) Field of Classification Search
   CPC .............................. G06T 11/005; G06T 11/006
   See application file for complete search history.

(56) References Cited

U.S. PATENT DOCUMENTS

| | | | |
|---|---|---|---|
| 7,596,256 B1 * | 9/2009 | Arie | G06T 7/0012 382/128 |
| 7,929,742 B2 | 4/2011 | Maltz | |
| 8,649,633 B2 | 2/2014 | Subbian et al. | |
| 8,699,823 B2 | 4/2014 | Boettger et al. | |
| 8,897,530 B2 | 11/2014 | Flohr et al. | |

(Continued)

FOREIGN PATENT DOCUMENTS

EP   1638051 A2   3/2006

OTHER PUBLICATIONS

Extended European Search Report #17189821.6 dated Nov. 17, 2017.

*Primary Examiner* — Kim Y Vu
*Assistant Examiner* — Molly Delaney
(74) *Attorney, Agent, or Firm* — Harness, Dickey & Pierce, P.L.C.

(57) ABSTRACT

A method and system for processing medical image data are disclosed. In an embodiment, the method includes providing measurement data of a to be reproduced body region of a patient; reconstructing, using a reconstruction algorithm, a first image volume representing the body region from the measurement data; identifying a subregion representing a partial volume of the first image volume, confining the subregion within the first image volume, and assigning a specific tissue structure, differing from a remaining volume of the first image volume, to the subregion; determining, based upon the specific tissue structure of the subregion, at least one reconstruction parameter varying in comparison to the first image volume; reconstructing, from the measurement data linked with the subregion and based upon the at least one reconstruction parameter, a second image volume; and contouring, within at least the second image volume, structure boundaries between different anatomical structures of the patient.

20 Claims, 1 Drawing Sheet

(56) References Cited

U.S. PATENT DOCUMENTS

2015/0036903 A1* 2/2015 Jerebko ................ G06T 11/008
  382/131
2018/0315223 A1* 11/2018 Vija .......................... G06T 7/11
2019/0261906 A1* 8/2019 Shirai ................ G01R 33/5602

* cited by examiner

METHOD FOR PROCESSING MEDICAL IMAGE DATA AND IMAGE PROCESSING SYSTEM FOR MEDICAL IMAGE DATA

PRIORITY STATEMENT

The present application hereby claims priority under 35 U.S.C. § 119 to European patent application number EP17189821.6 filed Sep. 7, 2017, the entire contents of which are hereby incorporated herein by reference.

FIELD

At least one embodiment of the invention generally relates to a method for processing medical image data. At least one embodiment of the invention also generally relates to an image processing system for medical image data.

BACKGROUND

Medical image data are normally acquired by systems that generate a heap of measurement data that have to be processed to represent an image of a patient's body region that can be viewed by a user. Often these measurement data show only varying gray scale values that resemble for example an attenuation of an X-ray beam that is projected onto the respective body region. Processing is typically realized by way of a reconstruction algorithm that fuses information from the measurement data such that a three-dimensional image, also called "image volume" of the respective body region is generated. For the respective viewing purpose that image volume can be sliced into single sectional views.

For planning a radiotherapy session usually topography of the body region that is to be irradiated has to be analyzed in order to know the position and boundaries of organs and other body tissue that for example may not be irradiated. Such topography can be derived from such an image volume as described above by methods like identifying landmarks or contouring tissue structures for example by way of pattern recognition algorithms or the like. Especially in radiotherapy the body regions of interest are comparatively large. Therefore, usually a reconstruction algorithm providing a comparably low resolution value for the image volume is used in order to save computing time.

Image processing methods which can be used in preparation of a radiotherapy are known for example from U.S. Pat. Nos. 7,929,742 B2, 8,699,823 B2, 8,649,633 B2 or 8,897,530 B2.

SUMMARY

At least one embodiment of the invention provides an improved processing of medical image data.

According to at least one embodiment of the invention that problem is solved by a method for processing medical image data. Furthermore, according to at least one embodiment of the invention, the problem is solved by an image processing system for medical image data.

At least one embodiment of the invention is directed to a method, comprising:
providing measurement data of a to be reproduced body region of a patient;
reconstructing, using a reconstruction algorithm, a first image volume representing the body region from the measurement data;
identifying a subregion representing a partial volume of the first image volume, confining the subregion within the first image volume, and assigning a specific tissue structure, differing from a remaining volume of the first image volume, to the subregion;
determining, based upon the specific tissue structure of the subregion, at least one reconstruction parameter varying in comparison to the first image volume;
reconstructing, from the measurement data linked with the subregion and based upon the at least one reconstruction parameter, a second image volume; and
contouring, within at least the second image volume, structure boundaries between different anatomical structures of the patient.

At least one embodiment of the invention is directed to an image processing system for medical image data, comprising:
at least one image processing processor, configured to execute at least
providing measurement data of a to be reproduced body region of a patient;
reconstructing, using a reconstruction algorithm, a first image volume representing the body region from the measurement data;
identifying a subregion representing a partial volume of the first image volume, confining the subregion within the first image volume, and assigning a specific tissue structure, differing from a remaining volume of the first image volume, to the subregion;
determining, based upon the specific tissue structure of the subregion, at least one reconstruction parameter varying in comparison to the first image volume;
reconstructing, from the measurement data linked with the subregion and based upon the at least one reconstruction parameter, a second image volume; and
contouring, within at least the second image volume, structure boundaries between different anatomical structures of the patient.

At least one embodiment of the invention is directed to a non-transitory computer-readable medium storing program segments, readable in and executable by a computer unit, to carry out the method of an embodiment of the application, when the program segments are executed by the computer unit.

BRIEF DESCRIPTION OF THE DRAWINGS

In the following an embodiment of the invention is described by way of the drawings. Therein is shown by.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The method according to at least one embodiment of the invention serves for processing medical image data. According to the method, measurement data of a patient's body region that is to be reproduced are provided. By way of a reconstruction algorithm a first image volume that represents the body region is reconstructed out of the measurement data. Preferably by way of a localization method or algorithm (especially in a first localization step) subsequently a subregion that represents a partial volume of the first image volume is identified and confined within the first image volume.

A specific tissue structure that differs from a tissue structure of a remaining volume of the first image volume is assigned to that subregion. On basis of that specific tissue structure of the subregion at least one reconstruction parameter is determined (preferably automatically) that varies in comparison to the first image volume. After that, based upon the respective changed reconstruction parameter a second image volume is reconstructed out of the measurement data linked with the above subregion. Within at least the second image volume structure boundaries between different anatomical structures are contoured, afterwards (thus, especially in a second localization step).

Preferably within the remaining volume of the first image volume structure boundaries between different anatomical structures are also contoured. That contouring is performed either during identification of the subregion or after reconstruction of the second image volume. In either way preferably the whole image of the body region represented by the first image volume—however, at least a region extending over parts of the remaining volume of the first image volume and over the second image volume—is contoured. Thus, the invention enables a contouring of tissue structure, i.e. anatomical structures such as organs and bones, based upon differently reconstructed image regions of an enclosing image volume (that is the first image volume). That in turn enables a processing of the image data saving computing time due to only partially using specific reconstruction parameters that are usually not needed for all tissue structures contained in the first image volume. Since the varying reconstruction parameters are chosen on the basis of a specific tissue structure identified within a region of the first image volume it is also possible to automate the processing of the image data. For example, a specific reconstruction parameter assigned to a specific tissue structure is determined by experiments and/or by machine learning processes and is stored in a database from which it can be retrieved upon identification of the respective tissue structure.

The term "contouring" is used here and in the following for the definition of boundaries between different tissue structures such as between bones and soft tissue and/or cartilage or between a specific organ and other soft tissue. Additionally, a segmentation can also lead to defined boundaries of tissue structures, and, thus, will be seen as a term that is comprised by the term "contouring", here and in the following.

According to an example embodiment of the invention, the first image volume is reconstructed by way of the reconstruction algorithm such that it exhibits a first, low resolution value. Preferably, the first resolution value corresponds to a number of pixels of 512×512 at an edge length of 50 cm of a quadratic image area. Alternatively, a number of pixels of 256×256 is used at the same image area. The image area is preferably chosen such that substantially the whole image area provided by the measurement data is utilized fully. A low resolution usually enables a comparably fast reconstruction of the first image volume such that computing time is saved. Additionally, an image volume having a low resolution value only occupies comparably small memory space. Preferably, the first resolution value is chosen such that general anatomic structures of the body region of interest can be identified and confined whereupon structures that are small in respect to the overall dimensions of the first image volume (for example at least 10 times or 100 times smaller than an edge length of the first image volume) are below the resolution limit.

According to a further example embodiment, the subregion for the reconstruction of the second image volume is identified by that at least one anatomic landmark is assigned to a region of the first image volume. Preferably, more than one landmark is assigned to the region. Advantageously, the respective landmark is assigned by way of a landmark identification algorithm. Expediently, the landmark itself (or a group of landmarks) is related to the specific tissue structure—for example a specific organ or a specific bone. The subregion for the reconstruction of the second image volume is in this connection confined (or "demarcated") on the basis of physical dimensions prespecified and preferably stored as some kind of estimated volume for the specific tissue structure. That means that the landmark to be assigned to the respective region of the first volume is expediently already (preferably by definition of the respective landmark itself) connected with a specific tissue structure (for example the neck or the head of the femur) that in turn is connected with at least empirically known (and stored) dimensions. Thus, based on the respective landmark the subregion is preferably confined based upon generalized, especially empirical dimensions. Based on more than one landmark the extent of the specific tissue structure can be confined more precisely. If at least three landmarks are assigned to one specific tissue structure, expediently, an orientation of the specific tissue structure can also be determined. Optionally, those empirical dimensions are enlarged by an uncertainty factor such that the demarcated subregion contains all of the specific tissue structure linked with the respective landmark, with a high probability. For example, the enlarged subregion is of cubic or cuboid shape. Hereby, automation of the method is easily enabled, especially, since localization of landmarks is typically also an automated process. Preferably, only those landmarks are used for the change of the at least one reconstruction parameter that are known by experience to cause problems with contouring of tissue structures under the topical reconstruction parameters (e.g. the first, low resolution value) of the first image volume.

According to another expedient example embodiment—as an alternative or in addition to the landmark-localization described above—the subregion for the reconstruction of the second image volume is identified by that a region of the first image volume is contoured (e.g. as mentioned above, segmented) as the specific tissue structure. In other words, regions that can be distinguished by their (e.g. "optical") appearance are confined from each other. Preferably, the specific kind of the respective tissue structure (kind of organ, bone or the like) is also assigned on the basis of the appearance.

However, depending on the topical (i.e. presently applied) reconstruction parameters of the first image volume—e.g. the topical, low resolution value—there can be problems with finding the actual tissue boundaries with high precision. Therefore, especially for such tissue structure an uncertainty factor is accounted for in order to confine the subregion for the reconstruction of the second image volume with regard to an adjacent tissue structure. In other words, the boundaries confining the area or preferably the volume of the respective subregion containing such (empirically problematic) tissue structure are enlarged by that uncertainty factor in a similar manner as described before. Therefore, the second image volume resulting from that subregion expediently contains all of the respective tissue structure with a high probability. Afterwards, preferably the at least one changed reconstruction parameter assigned to the respective tissue structure is retrieved from e.g. a database, a table or the like.

Optionally, a contouring algorithm used for contouring of the specific tissue structure stipulates a distinct reconstruction parameter in order to work properly. That is advantageous for example in connection with the landmark identification described above. The respective subregion can in that case be assigned with a specific changed reconstruction parameter due to requirements of the contouring algorithm, especially because in some embodiments a specific contouring algorithm is used for contouring a specific kind of tissue.

According to another example embodiment, a second resolution value being higher than the first resolution value is prescribed as a changed reconstruction parameter. In that case, the whole first image volume is reconstructed with the preferably low, first resolution value while saving computing time and only the second image volume is reconstructed at a higher resolution value—either by the same (first) reconstruction algorithm or a separate (second) reconstruction algorithm. For example, the second image volume contains cartilage tissue (e.g. at least a part of a femur head) and a comparably small joint space, or the inner ear (having very little structures) of the patient that each could not have been resolved during contouring under the first, low resolution value. Preferably, the second resolution value corresponds to the same (e.g. 512×512) number of pixels or a higher number of pixels (e.g. 512×512 if the first resolution value was at 256×256) at a smaller image area, e.g. 10×10 $cm^2$, 20×20 $cm^2$ or the like, than the first resolution value. Thus, a time saving image processing of a comparably large image volume containing also very small structures with the possibility to illustrate all relevant structures is enabled.

According to a further example embodiment, an orientation of the specific tissue structure differing from the orientation of the first image volume is prescribed as a changed reconstruction parameter (in addition or alternatively to the increased resolution value). This is advantageous in the case that the specific tissue structure is usually viewed (e.g. for diagnostic reasons) at a specific angle of view.

According to a still further example embodiment, a different artifact correction method and/or a different noise reduction scheme is prescribed as a changed reconstruction parameter. Furthermore, a changed noise grading can also be applied for the reconstruction of the second image volume. This is especially in that case advantageous that these measures can already be applied during reconstruction.

According to another expedient example embodiment, the respective landmark assigned to the subregion of the first image volume and/or the contouring result of the specific tissue structure within the first image volume is taken as a starting point for the (as the case may be new) contouring (within the second localization step; i.e. for the contouring algorithm used on the second image volume) within the second image volume. For that, the respective landmark and/or contours are transferred (i.e. projected) onto the second image volume. Due to that, computing time can be saved.

Optionally, the above contouring (within the second localization step) is performed on both, i.e. the first and the second image volume, conjointly. That means that the respective contouring algorithm works on both image volumes at the same time. E.g. in the case of the femur, a very small joint space within the hip joint is depicted by the second image volume and the rest of the femur's head and neck is contained within the first image volume, whereby the contouring algorithm works out the contours of the whole femur (i.e. including the joint space).

Further optionally, after the contouring step applied to the second image volume, additional manual contouring is performed by a user on the remaining volume of the first image volume and/or the second image volume, also. That could help to foster precision of the preceding contouring steps.

According to an example embodiment, the structure boundaries that are contoured in the second image volume are transferred to the first image volume for display. In other words, only the first image volume or single images derived therefrom is or are displayed, especially at the first, low resolution value. The information derived from the second image volume (probably at an increased resolution value) are hereby integrated into the first image volume or the respective images derived from the first image volume. By that, advantageously all information is integrated into one image volume that is especially used for display and can easily be handled due to its comparably small memory space.

Alternatively, a composite image is generated out of the first and the second image volume for display. That means that an image displayed e.g. on a screen is made up of image regions derived from the first image volume as well as from the second image volume, thus, resembling an overlay image of both image volumes (wherein the respective regions of the first image volume are replaced by the ones of the second image volume or the latter is cross-faded into the first image volume). That enables e.g. a "high definition" display of the respective content of the second image volume that is the basis of the second localization step.

Furthermore, optionally a noise reduction scheme is applied to the second image volume that generates a noise impression similar to that of the first image volume. That is especially advantageous if an overlay image of both image volumes is generated and if an increased resolution value is used for reconstruction. In the last case usually an increase of image noise is caused by the increased resolution value applied.

According to a further optional embodiment, the composite image is only displayed to a user if the amplification chosen by the user would enable a view of the higher resolved image data.

Optionally, a further separately reconstructed image volume is generated and used for display of the information derived from the first and second image volumes.

According to a further example embodiment, the measurement data is acquired by way of a computer tomography system having an X-ray source and a detector that are mounted to be rotatable around a patient's body. Preferably, the irradiation parameters are chosen such that an as high as possible resolution value can be achieved during reconstruction.

The image processing system according to at least one embodiment of the invention is used to process medical image data. The image processing system comprises at least one image processing processor (or computer) that in turn is equipped and designated to execute the method as described above. Therefore, the image processing system shows the same advantages as the method described above.

In at least one embodiment, the image processing system is constituted by a computer system having at least one computer on which at least one entity of reconstruction and/or localization (e.g. for finding landmarks and if applicable additionally for contouring during the first localization step and optionally the second localization step) is implemented. Optionally a third entity for contouring is implemented, also. For example the computer system is centralized in one workstation computer on which both (or all) requisite entities are implemented. Alternatively, the image processing system is decentralized or network based and, thus, reconstruction and localization (i.e. the first and the second localization steps) are implemented on different computers linked by network. However, in each case the functionality of the method according to the invention is implemented as a program such that by running the program the method is performed—as the case may be in interaction with the user—automatically.

According to an example embodiment the entities of localization and reconstruction are designed for data transfer by a programming interface such as an application programming interface ("API"), in a centralized as well as in a network based image processing system. Additionally or alternatively, data transfer between the respective entities (at least between the localization and reconstruction entities) is based upon DICOM standard.

Optionally, the image processing system also comprises a measurement system for generating the above mentioned measurement data. Such measurement system is preferably constituted by an X-ray computer tomography system. That in turn comprises an X-ray source and a detector (for detection of incoming X-rays and outputting measurement signals linked to the incoming X-ray intensity) that are arranged to rotate around the patient's body during operation.

The conjunction "and/or" is used here and in the following especially such that the features or terms linked by that conjunction can be designed or occur in combination as well as alternatively.

Figure 1:
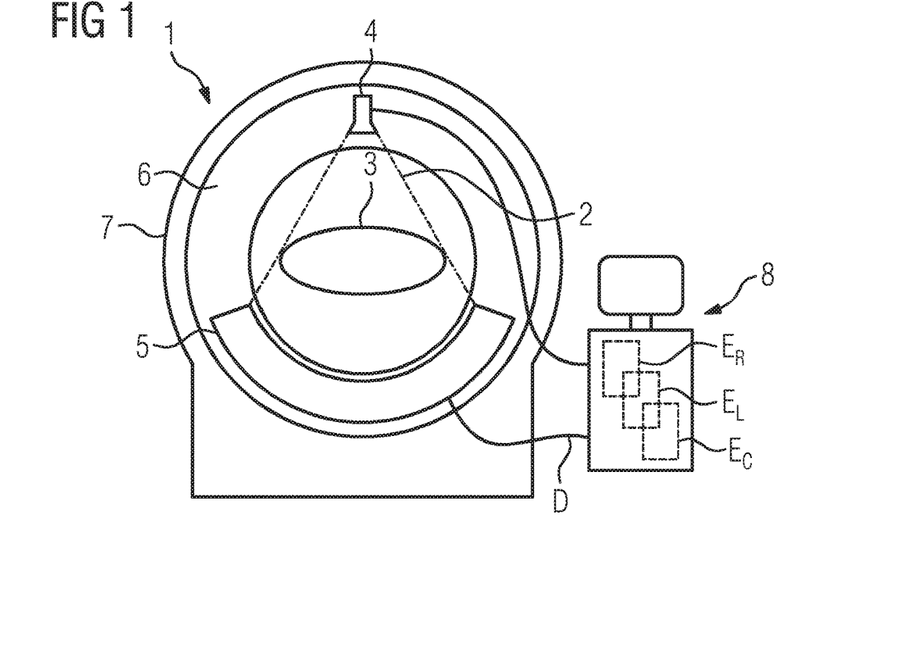
FIG. 1 in a schematic view an image processing system, and
FIG. 2 in a schematic flow chart the course of a method performed by the image processing system.
In every figure same features and dimensions are assigned the same reference signs.

FIG. 1 depicts an image processing system 1, in particular an X-ray computer tomography system. The image processing system 1 includes device(s) to generate measurement data D that corresponds to the attenuation of an X-ray beam 2 irradiated onto a body 3 of a patient. These include an X-ray source 4 and an X-ray detector 5 allocated opposite to the X-ray source 4 on a rotating assembly 6. The rotating assembly 6 is rotatably mounted on a gantry 7. For control and evaluation the X-ray source 4 and the detector 5 are connected to an image processing processor, in particular a workstation 8.

The X-ray beam 2 irradiated onto the body 3 of the patient during a measuring operation of the image processing system 1 is attenuated or blocked by the body 3 in dependence of locally differing tissue structure within the body 3 and, thus, causes differing measurement signals at respective single detector elements of the detector 5. These measurement signals are sent to the workstation 8 and resemble the measurement data D. The measurement data D in turn reflects a spatially varying gray scale or intensity distribution across the length of the detector 5 and, thus, along the rotation path of the detector 5 and the X-ray source 4.

The measurement data D is usually reconstructed by a reconstruction algorithm R (implemented in the workstation 8 within the framework of a reconstruction entity $E_R$) to resemble a three-dimensional image volume of the body region of the body 3 that has been irradiated with the X-ray beam 2. In order to help a user of the image processing system 1, especially a medical personnel with identification of different kinds of tissue (different tissue structures) such as bones, necks and cartilaginous joint heads of bones, organs and the like and the respective boundaries often automatic localization schemes are applied to the reconstructed image volume. Usually such schemes are also implemented as algorithms (especially within the framework of localization entities $E_L$ and/or contouring entities $E_C$ of an image processing program). In order to save computing time during reconstruction usually the respective reconstruction algorithm R generates the image volume with a prescribed comparably low resolution value. For enabling an easy identification of comparably small structures in an image volume an inventive method as described below is applied.

Figure 2:
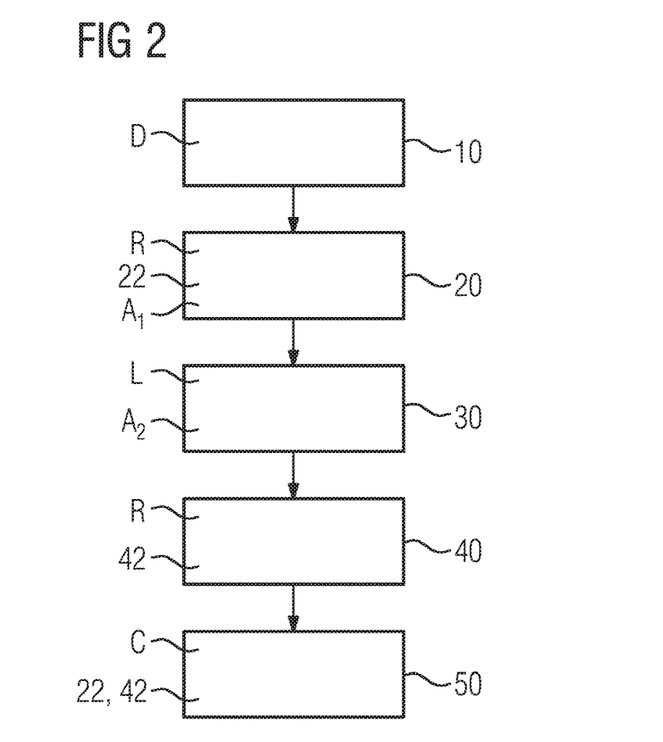

According to an embodiment of a method of the present application, in a first step 10 the above mentioned measurement data D is provided in the workstation 8, in particular by irradiating the body 3 with the X-ray beam 2 and measuring the intensity at the detector 5. In a second step 20 the reconstruction entity $E_R$ and, thus, the reconstruction algorithm R is started such that a first image volume 22 representing the region of the body 3 irradiated with the X-ray beam 2 is reconstructed out of the measurement data D. The first image volume 22 is thereby reconstructed at a first resolution value $A_1$.

In a third step 30 the localization entity $E_L$ is started which runs a landmark localization algorithm L. The localization algorithm L is designed such that it searches the first image volume 22 for known tissue structures and assigns respective landmarks to these known tissue structures. Furthermore, the localization algorithm L triggers if it has found a prescribed specific tissue structure that cannot be precisely contoured at the topical first resolution value $A_1$ (e.g. the cartilaginous head of the femur) a demarcation of a subregion of the first image volume 22. That subregion shall contain with a high probability the whole specific tissue structure (i.e. the whole head of the femur). Dimensions of the respective subregion for positioning of the demarcation are taken out of a table where empirically determined dimensions are assigned to specific tissue structures. The respective landmark is in that case assigned for example to a central point of the specific tissue structure or several landmarks are assigned to an area covered by the specific tissue structure. The localization algorithm L also assigns a changed reconstruction parameter, in particular an increased second resolution value $A_2$ to the landmark or the subregion, respectively. That increased resolution value $A_2$ is also stored in the above mentioned table.

In a fourth step 40 information defining the previously identified subregion as well as the changed second resolution value $A_2$ is transmitted to the reconstruction entity $E_R$ by way of an API. Then, the reconstruction algorithm R is applied to a region corresponding to the above subregion within the measurement data D. Thereby, a second image volume 42 is reconstructed under application of the second resolution value $A_2$.

Afterwards, the first image volume 22 and the second image volume 42 are transmitted to the contouring entity EC of the workstation 8 in a fifth step 50. In step 50 a contouring algorithm C is run on the second image volume 42 and the remaining region of the first image volume 22. Contouring algorithm C is used to identify regions and boundaries of all different tissue structures within both image volumes 22 and 42. According to a computing time saving version of that embodiment, the tissue regions and boundaries derived from the second image volume 42 are projected onto the first image volume for display. The result is that the first low resolved image volume can be displayed without the need of enhanced graphics support but including all relevant information derived from each image volume 22 and 42, respectively. According to an alternative version, the region of the first image volume 22 corresponding to the second image volume 42 is completely replaced by the second image volume 42 and the contouring information derived therefrom.

A further step wherein the respective image volumes 22 and/or 42 are displayed on a screen e.g. of the workstation 8 is not depicted here in detail.

According to an alternative embodiment not depicted in detail the reconstruction entity $E_R$ is implemented in the workstation 8. The localization and contouring entities $E_L$ and $E_C$ are implemented on a further computer that is linked to the workstation 8 by a data network. In that case information is transferred by way of a network communication protocol between the separate entities $E_R$, $E_L$ and $E_C$.

Optionally and not shown, either, the control of the scanner (i.e. the X-ray source 4 and the detector 5) is also implemented in a separate workstation connected to the workstation 8.

The subject matter of the invention is not restricted to the embodiments described before. Rather, additional embodiments of the invention can be derived by a person skilled in the art from the preceding specification. In particular, the separate features of the invention and their variants as described by way of the respective embodiments can be combined in other ways, either.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising
providing measurement data of a to be reproduced body region of a patient;
reconstructing, using a reconstruction algorithm, a first image volume representing the body region from the measurement data;
identifying a subregion representing a partial volume of the first image volume, confining the subregion within the first image volume, and assigning a specific tissue structure, differing from a remaining volume of the first image volume, to the subregion;

determining, based upon the specific tissue structure of the subregion, at least one reconstruction parameter varying in comparison to the first image volume;

reconstructing, from the measurement data linked with the subregion and based upon the at least one reconstruction parameter, a second image volume; and contouring, within at least the second image volume, structure boundaries between different anatomical structures of the patient.

2. The method of claim 1, wherein the first image volume is reconstructed using the reconstruction algorithm to exhibit a first resolution value.

3. The method of claim 1, wherein the subregion for the reconstructing of the second image volume is identifiable by at least one anatomic landmark being assigned to a region of the first image volume, the at least one anatomic landmark being related to the specific tissue structure, and wherein the subregion for the reconstructing of the second image volume is confined based upon physical dimensions prespecified for the specific tissue structure.

4. The method of claim 1, wherein the subregion for the reconstructing of the second image volume is identifiable by a region of the first image volume being contoured as the specific tissue structure, and wherein the confining of the subregion, for the reconstructing of the second image volume with regard to an adjacent tissue structure, takes an uncertainty factor into account.

5. The method of claim 2, wherein a second resolution value, relatively higher than the first resolution value, is prescribed as a changed reconstruction parameter.

6. The method of claim 1, wherein an orientation of the tissue structure, differing from the orientation of the first image volume, is prescribed as a changed reconstruction parameter.

7. The method of claim 1, wherein at least one of a different artifact correction method and a different noise reduction scheme is prescribed as a changed reconstruction parameter.

8. The method of claim 4, wherein at least one of at least one landmark assigned to and a contoured region of the first image volume related to the specific tissue structure, is taken as a starting point for the contouring within at least the second image volume.

9. The method of claim 1, wherein structure boundaries contoured in the second image volume are transferred to the first image volume for display.

10. The method of claim 1, wherein the providing includes providing the measurement data via a computer tomography system.

11. An image processing system for medical image data, comprising:

at least one image processing processor, configured to execute at least providing measurement data of a to be reproduced body region of a patient;

reconstructing, using a reconstruction algorithm, a first image volume representing the body region from the measurement data;

identifying a subregion representing a partial volume of the first image volume, confining the subregion within the first image volume, and assigning a specific tissue structure, differing from a remaining volume of the first image volume, to the subregion;

determining, based upon the specific tissue structure of the subregion, at least one reconstruction parameter varying in comparison to the first image volume;

reconstructing, from the measurement data linked with the subregion and based upon the at least one reconstruction parameter, a second image volume; and contouring, within at least the second image volume, structure boundaries between different anatomical structures of the patient.

12. A non-transitory computer-readable medium storing program segments, readable in and executable by a computer unit, that when the program segments are executed by the computer unit cause the computer unit to provide measurement data of a to be reproduced body region of a patient;

reconstruct, using a reconstruction algorithm, a first image volume representing the body region from the measurement data;

identify a subregion representing a partial volume of the first image volume, confining the subregion within the first image volume, and assigning a specific tissue structure, differing from a remaining volume of the first image volume, to the subregion;

determine, based upon the specific tissue structure of the subregion, at least one reconstruction parameter varying in comparison to the first image volume;

reconstruct, from the measurement data linked with the subregion and based upon the at least one reconstruction parameter, a second image volume; and contour, within at least the second image volume, structure boundaries between different anatomical structures of the patient.

13. The method of claim 2, wherein the subregion for the reconstructing of the second image volume is identifiable by at least one anatomic landmark being assigned to a region of the first image volume, the at least one landmark being related to the specific tissue structure, and wherein the subregion for the reconstructing of the second image volume is confined based upon physical dimensions prespecified for the specific tissue structure.

14. The method of claim 2, wherein the subregion for the reconstructing of the second image volume is identifiable by a region of the first image volume being contoured as the specific tissue structure, and wherein the confirming of the subregion, for the reconstructing of the second image volume with regard to an adjacent tissue structure, takes an uncertainty factor into account.

15. The method of claim 3, wherein the first image volume is reconstructed using the reconstruction algorithm to exhibit a first resolution value and wherein a second resolution value, relatively higher than the first resolution value, is prescribed as a changed reconstruction parameter.

16. The method of claim 4, wherein the first image volume is reconstructed using the reconstruction algorithm to exhibit a first resolution value and wherein a second resolution value, relatively higher than the first resolution value, is prescribed as a changed reconstruction parameter.

17. The method of claim 2, wherein an orientation of the specific tissue structure, differing from the orientation of the first image volume, is prescribed as a changed reconstruction parameter.

18. The method of claim 2, wherein at least one of a different artifact correction method and a different noise reduction scheme is prescribed as a changed reconstruction parameter.

19. The non-transitory computer-readable medium storing program segments of claim 12, wherein the first image volume is reconstructed using the reconstruction algorithm to exhibit a first resolution value.

20. The method of claim 2, wherein a contouring algorithm is used for contouring of specific tissue structure stipulating a distinct reconstruction parameter.

* * * * *